March 6, 1956    W. T. SHREVE ET AL    2,737,653
INDEPENDENT ELECTRONIC RANGE STROBE AND AZIMUTH CURSOR
Filed May 28, 1949      3 Sheets-Sheet 1

INVENTORS
WARREN T. SHREVE
& STEWART L. ARENSBERG
BY
ATTORNEY

March 6, 1956  W. T. SHREVE ET AL  2,737,653
INDEPENDENT ELECTRONIC RANGE STROBE AND AZIMUTH CURSOR
Filed May 28, 1949  3 Sheets-Sheet 2

INVENTORS
WARREN T. SHREVE
& STEWART L. ARENSBERG
BY: J. L. Whittaker
ATTORNEY

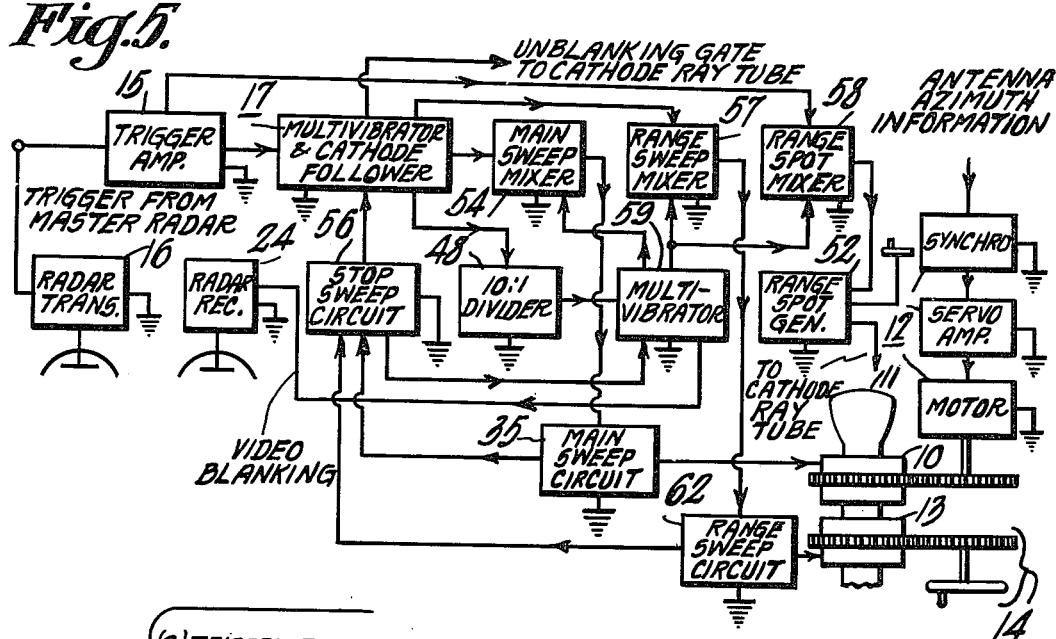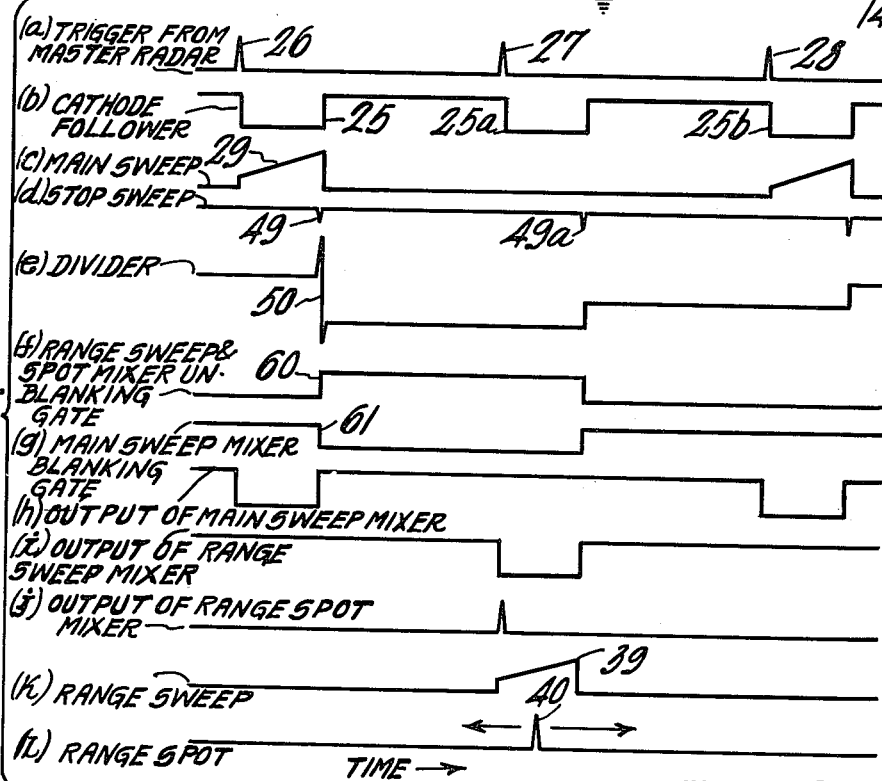

United States Patent Office 2,737,653
Patented Mar. 6, 1956

2,737,653

INDEPENDENT ELECTRONIC RANGE STROBE AND AZIMUTH CURSOR

Warren T. Shreve, Philadelphia, Pa., and Stewart L. Arensberg, Collingswood, N. J., assignors, by mesne assignments, to the United States of America as represented by the Secretary of the Navy Application May 28, 1949, Serial No. 96,048

18 Claims. (Cl. 343—11)

This invention relates to radar indicator systems, and more particularly to P. P. I. (plan-position-indicator) type radar indicators that employ an electromagnetic cathode ray tube.

In the various well known types of radar systems that employ P. P. I. type presentation, the beam of the cathode ray tube of the indicator is caused to sweep radially outward from the center of the tube to the edge thereof in a direction which corresponds with the position in azimuth of the antenna of the system. The direction of deflection of the beam or sweep of the tube is controlled by and synchronized with the antenna position throughout 360° rotation of the antenna and the tube is intensity modulated by the video output of the receiver to cause a bright spot to appear on the long persistence screen of the tube when the sweep has been deflected in a direction which corresponds to the antenna azimuth on which a transmitted signal has been reflected back to the antenna by a remote object or surface. Accordingly, as the antenna is rotated through 360°, a polar map of the surrounding area is developed in which the range to various reflecting objects or surfaces in the area is plotted radially against their relative bearing from the radar system.

In the conventional systems of the described type, exact range to one of the objects indicated on the indicator screen is obtained by stopping or positioning the antenna on the bearing of the object, and consequently causing the sweep or beam of the tube to be deflected in a direction corresponding to the direction of the object appearing on the screen, and manually adjusting a control mechanism that intensity modulates the beam of the tube a known interval of time after the radially outward sweep of the beam has been initiated. As the time interval adjustment is generally calibrated directly to range, the range to the particular object may then be read directly. This method of obtaining ranges of a particular object appearing on the screen of the indicator has been unsatisfactory because it is necessary to interrupt the continuous scanning during the time required to position the antenna on the bearing of the particular object and to make the necessary adjustment to the range spot control, and because this operation commonly involves a period of time greater than the persistence of the indicator screen. Accordingly, continuous observation on the other objects appearing on the screen cannot be made.

It is one of the objects of this invention to provide a method of and means for obtaining range and azimuth information on any particular target appearing on a P. P. I. type radar indicator independently of the position of the associated antenna and without interrupting the continuous presentation of information on other objects represented on the indicator screen.

A further object of the invention is to provide a P. P. I. type indicator having a range spot that is subject to manual control in both azimuth and range and that may be employed to determine the range and bearing of one of various objects appearing on the screen of the indicator, without interrupting the normally continuous presentation of data on all of the objects appearing on the indicator screen.

A further object of the invention is to provide a range strobe and azimuth cursor in a P. P. I. type radar indicator that may be operated independently of the antenna position and that utilizes the time interval between the end of one main sweep and the beginning of the succeeding main sweep, which sweeps are controlled in direction by the position of the antenna, to present a movable range spot.

A further object of the invention is to provide a range strobe and azimuth cursor in a P. P. I. type radar indicator that may be manually controlled independently of the radar antenna position and that periodically present a movable range spot on the indicator screen during an interval in which the main sweep controlled by the antenna position is suppressed.

A further object of the invention is to provide a radar indicator in which the activation of various circuits of the indicator, employed to present a range spot manually movable in bearing and range independently of the position of the associated antenna and without interrupting the continuous scanning by the antenna, is accomplished during the recovery time of the main sweep, whereby irregular patterns on the screen of the indicator are avoided.

Further objects and advantages of the invention will be apparent from the following detailed description made with reference to the accompanying drawings in which like reference numerals indicate similar elements throughout.

In the drawings:

Figure 5 is a block diagram illustrating another embodiment of the invention in a system in which the main sweep is periodically suppressed and the movable range spot is presented during the resulting interval; and Figure 6 is a chart illustrating the wave forms of the outputs of various circuits comprising the embodiment of the invention illustrated in Figure 5.

Figure 1:
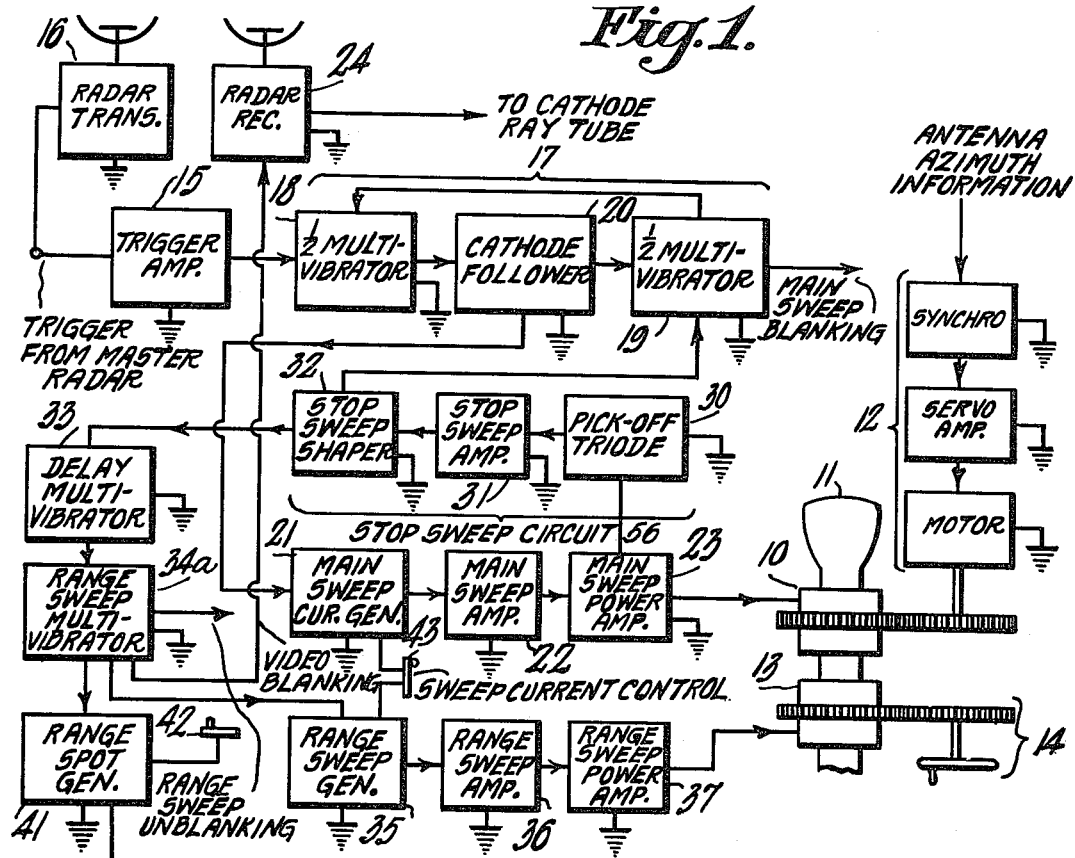
Figure 1 is a block diagram illustrating one embodiment of the invention in which the time interval between the end of one main sweep and the beginning of the next main sweep is utilized to present a movable range spot.
Figure 3:
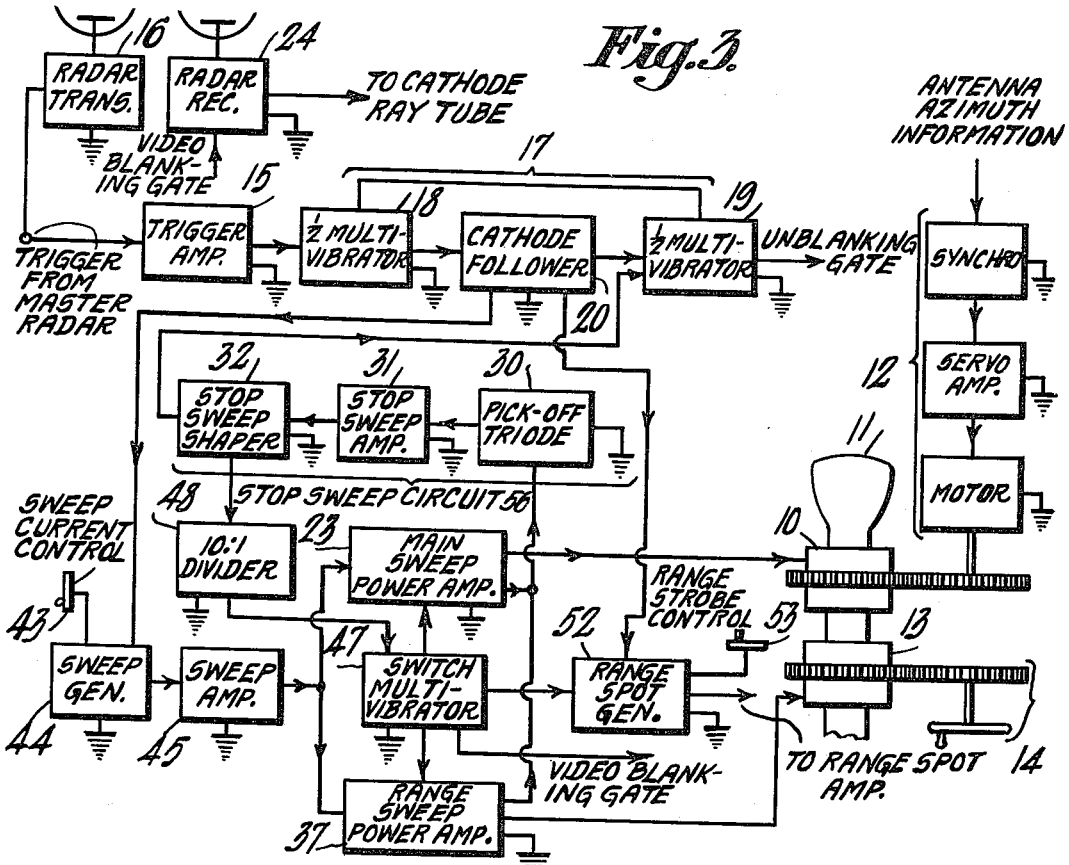
Figure 3 is a block diagram of another embodiment of the invention in which one of the main sweeps is periodically suppressed and a movable range spot is presented during the resulting interval.

In the radar indicator system illustrated in Figures 1, 3 and 5 of the drawings, a main sweep deflection coil 10 is rotatably supported on the neck of the cathode ray tube 11 of the indicator. A servo system indicated generally at 12 connects the rotatable coil 10 mechanically to the antenna of the associated radar system and causes the coil to move coincidentally in azimuth with the antenna, which in normal operation of the system continuously scans throughout 360°. The deflection current may be applied to the rotatable coil 10 through a suitable slip ring assembly. A range sweep deflecting coil 13 is also rotatably supported on the neck of the tube 11 immediately adjacent the coil 10 and is arranged to be manually rotated by the control assembly 14 whereby the beam of the tube 11 may be deflected in any desired radial direction. To avoid interference with the presentation of data by the main sweep circuit that includes the coil 10, the range sweep coil 13 is energized during periods that are intermediate the periods that the main sweep coil 10 is energized. This may be accomplished during the time that would normally be used by one of the main sweeps or during the interval between the end of one main sweep and the beginning of the successive main sweep. A movable range spot is presented in conjunction with the range sweep, and accordingly the range strobe and azimuth cursor, comprising the coil 13 and the associated movable range spot circuits, make it possible to observe the range and bearing of any target presented on the indicator by the main sweep without interrupting the continuous scan by the main sweep and without causing the indications of other objects to fade from the screen during an individual range and bearing observation on a particular reflecting object.

It may be noted that preferably some provision is made to minimize interaction between the deflecting coils 10 and 13. For example, shielding between the two deflecting coils may be provided. However, it is preferred to employ the arrangement described and claimed in application Serial No. 94,122, filed May 19, 1949 in the names of Warren T. Shreve and Robert J. McCurdy and entitled Cathode Ray Tube Deflection Yoke Interference Elimination. Said arrangement may comprise, for each deflection winding, a unidirectional flow device in series therewith, said winding and device being shunted by a series-connected resistor and second unidirectional flow device. The said devices are connected in current conducting opposition with respect to voltages induced by mutual coupling in the winding to which they are connected.

Figure 2:
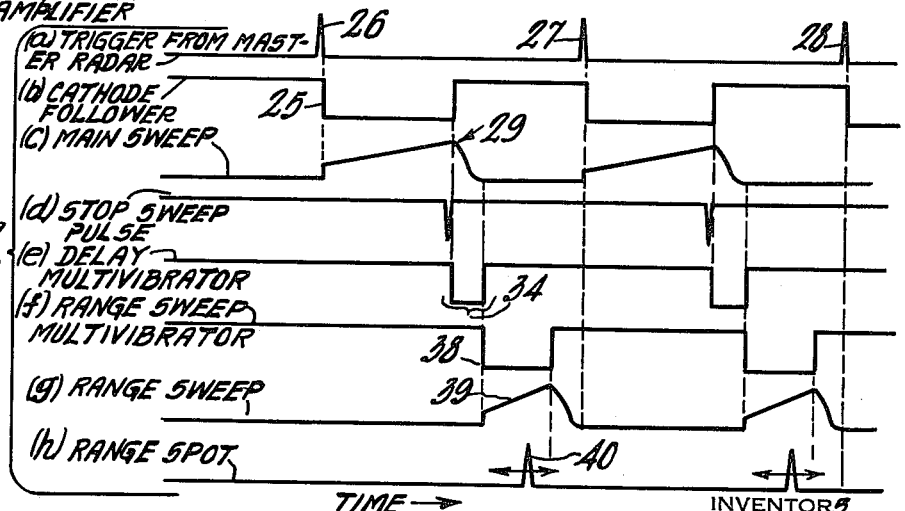
Figure 2 is a chart illustrating the wave forms of the outputs of various circuits employed in the embodiment of the invention illustrated in Figure 1.

One specific manner in which this desired operation may be obtained is illustrated in Figure 1 in which is shown a radar system including a P. P. I. type indicator in which indicator successive trigger pulses from the master radar are supplied to the trigger amplifier 15 as the transmitter 16 of the system propagates successive ranging pulses. The indicator trigger pulse thus amplified is passed to the multivibrator indicated generally at 17 which comprises a stage 18 and a stage 19 and a cathode follower 20 interposed therebetween. The multivibrator 17 is of the type that will complete a cycle of operation when triggered by a single pulse if the multivibrator is allowed to run for the time determined by its time constant for it to return to its original or normal mode or condition of operation. The cathode follower 20 is interposed between the two halves of the multivibrator to prevent loading of the multivibrator circuit in order to retain a steep leading edge on the output pulses of the multivibrator and to obtain a sharp cutoff of the multivibrator output through the cathode follower when the multivibrator is shifted from one mode of operation to another. The multivibrator 17 has one condition of equilibrium. In its normal condition of equilibrium, the stage 19 is conducting and the plate circuit of the stage 19 is connected to the cathode ray tube of the indicator to blank the tube. In its second condition of operation, the stage 18 is conductive and the output is applied through the cathode follower 20 to a main sweep current generator 21. The output of the main sweep current generator 21 is amplified in the amplifier 22 and passes through the power amplifier 23 to the main sweep coil 10. As the position of the coil is correlated to the antenna position, the current passing through the coil will cause a deflection of the beam of the tube 11 in a radial direction corresponding to the antenna position. In the event a radiated pulse has been reflected from a distant object and picked up by the receiver component 24 of the system during the course of the sweep of the beam obtained in the manner described, a video output is obtained which is applied to intensity modulate the electron beam of the tube 11 and to cause a bright spot to appear on the long persistence screen of the tube at a distance from the center of the tube corresponding to the distance of the reflecting object from the radar system. It is essential that the cathode ray tube screen have sufficiently long image persistence to retain the entire radar image until the range spot may be superimposed on the desired radar image element. The sequence and duration of the outputs of the circuits thus far described are represented in Figures 2, (a), (b) and (c).

It will be observed that the output pulses of the multivibrator 17 through the cathode follower 20, graphically represented at 25, in Figure 2(b) are initiated simultaneously with the occurrence of the trigger pulse 26 (Figure 2(a)) and the successive trigger pulses 27 and 28 which are applied to the indicator system simultaneously with the transmission of successive radiated pulses by the transmitter 16. The application of the cathode follower output pulses 25 to the main sweep current generator 21 causes the main sweep current generator to produce output current pulses which rise linearly to the value indicated at 29 (Figure 2(c)) at which point the current is sufficient to cause the desired scale deflection of the beam of the tube 11. A portion of the output of the generator 21, as amplified in the stages 22 and 23, is passed to a pick-off triode 30 and as the output current reaches the value indicated at 29 (Figure 2(c)), which is sufficient to cause the desired scale deflection of the beam of the tube 11, the pick-off triode becomes conductive and the output of the triode is amplified in the stop sweep amplifier 31 and is passed to a stop sweep pulse shaper 32 which produces an output having a wave form as indicated in Figure 2(d). The sharp pulse output of the shaper 32 is applied to the multivibrator 17 and causes the multivibrator to revert to its condition of equilibrium in which the output of the stage 19 is applied to blank the cathode ray tube 11 and the output of the stage 18 to the cathode follower 20 is cut off. Accordingly, the grid cathode bias of the pick-off triode 30 may be selected or adjusted in any known manner to limit the deflection of the sweep to any desired extent. As previously explained, the multivibrator 17 is the type that will cycle to its original mode of operation on a single trigger pulse, and consequently in the event the stop sweep circuit comprising the elements 30, 31 and 32 become inoperative, the sweep current generation will nevertheless be interrupted when the multivibrator 17 returns automatically to its first mode of operation.

During the recovery time of the main sweep, the independent range sweep is generated. A portion of the output of the stop sweep shaper 32, which occurs at the end of the main sweep, is applied to the delay multivibrator 33 which at the end of a delay corresponding in time with the pulse width 34, as illustrated in Figure 2(e), the range sweep multivibrator 34a is triggered which in turn activates the range sweep generator 35. The output of the generator 35 is amplified successively in the amplifiers 36 and 37 and applied to the deflecting coil 13 which causes the beam of the tube 11 to be deflected in a direction corresponding to the setting of the coil made by the control mechanism 14. The constants of the multivibrator 34a are selected so that the output, represented by the wave form 38 in Figure 2(f), is terminated, and the range sweep current generator 39 interrupted, before the successive triggering pulse 27 (Figure 2a) is applied to the indicator simultaneously with the transmission of a successive radiated pulse by the transmitter 16. It will be apparent that the rise time of the sweep current generators may be varied in any known manner, the only limitation being that the rise time of the two generators, in addition to the delay introduced by the multivibrator 33 and that necessary at the end of the range sweep current generation to permit the current in the deflecting coils to return to zero value, does not exceed the duty cycle of the system. It is seen that since the slope of the range sweep pulses 39 is definitely related to the slope of the main sweep pulses 29, it is readily possible to calibrate in terms of distance the position of the range spot with respect to any selected radar image element. The rise time of the range sweep current generator 35, however, should not be shortened to the extent that the range spot presented by the sweep is unduly elongated, thereby making accurate range observation difficult.

A portion of the range sweep multivibrator output 38 is also applied to a range spot generator 41 which produces a short pulse 40 (Fig. 2(h)) at the end of an adjustable interval, which pulse is amplified and applied to the cathode ray tube 11 to intensity modulate the beam thereof. As the range spot pulse generation is initiated simultaneously with the range sweep current generation, the setting of the range spot generator 41 may be directly calibrated in distance and the distance of a particular object indicated on the screen may be obtained by moving the spot radially outward into coincidence with the spot on the screen that represents the particular object. The range and bearing of the particular object will be available by observing the operating positions of control mechanism 14 and range spot interval control mechanism 42. The coil 13 may be positioned to deflect the beam along the bearing on which is located the object to be observed and the range spot may be manually moved into coincidence with the object to be observed without interrupting the continuous scanning operation by the main sweep.

During the presentation of the range sweep, the video output of the receiver 24 is blanked to prevent received signals from appearing on the range sweep trace. This is accomplished by applying a portion of the output of the multivibrator 34a to the video stage of the receiver as illustrated in Figure 1. The multivibrator 17 will be in its condition of equilibrium during the presentation of the range sweep in which position the output of the stage 19 is applied to blank the cathode ray tube 11. Consequently, a portion of the output of the multivibrator 34a is also applied to the tube 11 to unblank the tube during the interval in which the range sweep is to be presented.

In order to vary the range scale on which the data appearing on the screen of the indicator tube are presented, a sweep current control 43 is provided which is connected to the sweep generators 21 and 35 to vary the rise time of these generators proportionally. In the event the generators comprise R-C type circuits, the sweep control 43 may consist of ganged resistors connected into these circuits to vary the R-C constants of the circuits, and accordingly the time required for the output currents thereof to reach a desired value.

The same type of independent range strobe and azimuth cursor presentation intermediate the main sweep presentation, may be obtained in the manner illustrated in Figure 3 in which the main sweep is periodically eliminated and the range sweep is presented in the interval during the elimination of the main sweep. In this instance, the output 25 of the cathode follower 20 is applied to a single sweep generator 44 whose output is amplified in the amplifier 45. The output of the sweep amplifier 45 is applied to the main sweep coil 10 or to the range sweep coil 13 in a manner hereinafter described. The sweep current generated by the generator 44 is diverted exclusively through conductor 46 to the main sweep coil 10, or through the conductor 46a to the range sweep coil 13, depending on the condition of the electronic switch 47 which may be a multivibrator or other suitable type circuit. Normally, the sweep current is passed through the main sweep power amplifier 23 to the main sweep coil 10, the range sweep power amplifier 37 being blanked by the output of the switch 47 in its normal condition. Periodically, the switch 47 is triggered by a frequency divider 48 to a second condition in which the main sweep power amplifier 23 is blanked and the range sweep power amplifier 37 is activated, thereby permitting the sweep current to pass to the range sweep coil 13. The frequency divider 48, which may comprise a counter and blocking oscillator, is supplied with a portion of the pulse output of the stop sweep shaper circuit 32 and is arranged to fire after receiving a preselected number of pulses from the stop sweep circuit (which will be assumed to be ten for purposes of illustration) and triggers the switch 47 to its second condition in which the sweep current is passed to the range sweep deflecting coil 13.

Figure 4:
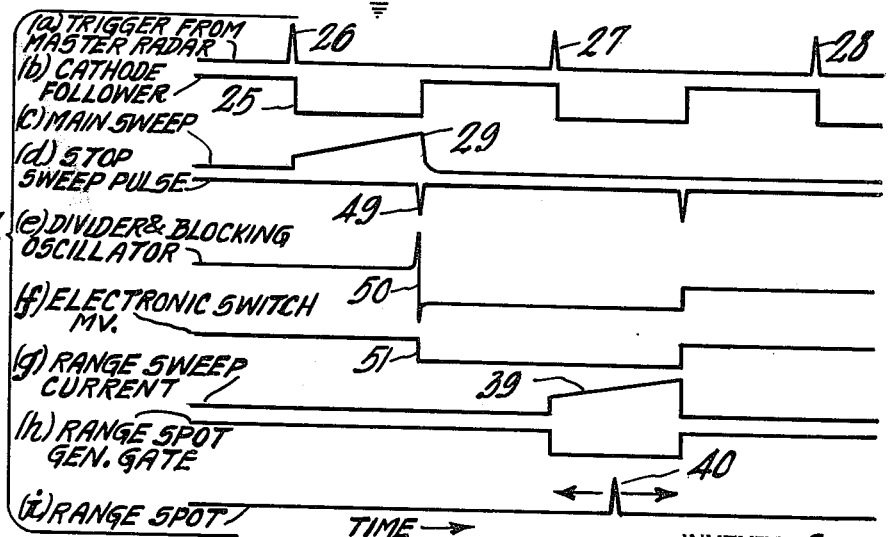
Figure 4 is a chart of the wave forms of the outputs of various circuits comprising the embodiment of the invention illustrated in Figure 3.

In the drawings, the stop sweep pulse which causes the divider to fire is indicated at 49, Figure 4(d), and the corresponding output of the divider at 50 in Figure 4(e). The output of the switch 47, which when triggered by the output 50 of the divider causes the main sweep power amplifier 23 to be blanked and the range sweep power amplifier 37 to be activated, is indicated at 51 in Figure 4(f). A portion of the output of the switch 51 is applied to a range spot generator 52 to unblank the generator preparatorily to its activation simultaneously with the generation of the sweep current, which is periodically passed to the range sweep coil 13. A portion of the output of the switch 47 is also applied to the video stage of the receiver 24 to prevent received signals from appearing on the range sweep trace.

It will be observed that the switching action which places the described circuits in condition to present the range sweep on the indicator occurs at the termination of the main sweep as a result of the triggering action of the pulse received from the stop sweep circuit 30—32. The stop sweep deflection circuit employed herein may be of the general type disclosed in Rieke U. S. Patent No. 2,414,486. The generation of the sweep current which will subsequently be passed to the range sweep coil 13 does not occur until a subsequent pulse 27 has been applied to the indicator. When the pulse 27 is applied to the indicator, the output of the cathode follower 20 is applied to the sweep current generator 44 and simultaneously to the range spot generator 52 through conductor 52a whereby the range spot may be made to occur at a known interval with respect to the time of the initiation of the range sweep current, thus making it possible to calibrate the adjustable setting of the range spot generator directly in distance.

A portion of the output of the range sweep power amplifier 37 is applied to the pick-off triode 30 and, in the same manner as described heretofore with reference to the main sweep circuit, when the current passed to the triode reaches a value which corresponds to the desired scale deflection of the cathode tube beam by the sweep current, the triode is activated and passes a signal to the amplifier 31 which is shaped to the pulse 49a as illustrated in Figure 4(d). This pulse is applied to multivibrator 17 and returns it to its original mode and also supplies the first pulse of the sequence necessary to again actuate the divider 48. A sweep current control 43 capable of varying the rise time of the sweep current generator 44 may be provided to alter the scale of presentation on the screen of the tube 11.

The range and bearing of an object represented on the screen of the indicator, may be obtained by means of the independent range strobe and azimuth cursor control 53 of Figure 3 without interfering with the continuous scanning operation of the antenna in the same manner as described previously with regard to Figure 1.

Independent operation of the range strobe and azimuth cursor may be similarly obtained, during a period in which the main sweep is eliminated, in the following manner illustrated in Figures 5 and 6, wherein a portion of the output of the multivibrator 17 is applied to a main sweep mixer 54, the output of which is applied to the main sweep circuit 55, which may comprise the main sweep current generator 21, the main sweep amplifier 22 and the power amplifier 23 as illustrated in Figure 1. The output of the main sweep circuit 55 is applied to the main sweep deflecting coil 10. The operation of the circuit is similar to that described with respect to Figures 1 and 3, a portion of the output of the sweep circuit being applied to the stop sweep circuit 56 which may be constituted similarly to the stop sweep circuits illustrated in Figures 1 and 3. The pulse outputs 49 of the stop sweep circuit, as illustrated in Figure 6(d), are applied to the multivibrator 17 to return the multivibrator to its original mode of operation, as previously described. The range sweep and range spot circuits comprise the range sweep mixer 57 and the range spot mixer 58, respectively, the latter of which receives a portion of the output of the trigger amplifier 15 and the former of which receives a portion of the output of the multivibrator 17. The mixers 57 and 58 are normally biased off and they become conductive only when supplied a positive going pulse from the multivibrator 59. The multivibrator 59 also supplies a negative going pulse 61 to the main sweep mixer 54 whereby the main sweep mixer is blanked, as shown in Figure 6(g), during the periods in which the mixers 57 and 58 are conducting. The multivibrator 59 is triggered periodically, to render the mixers 57 and 58 conductive and to blank the main sweep mixer, by the divider 48 which may include circuits similar to those described in reference to Figures 1 and 3. When the divider 48 has received from the multivibrator 17 the end of the last of the succession of pulses necessary to fire the divider, the divider output 50 illustrated in Figure 6(e), triggers the multivibrator 59 which produces a positive going signal 60, shown in Figure 6(f), which unblanks the mixers 57 and 58 and also produces a negative going signal 61 of the form illustrated in Figure 6(g), which blanks the main sweep mixer 54. The output of the main sweep mixer 54, shown in Figure 6(h), is the result of wave forms 25 and 61, Figures 6(b) and 6(g). The output of the range sweep mixer is shown in Figure 6(i) and is the result of wave forms 25a and 60, shown in Figures 6(b) and 6(f). The output of the range spot mixer, shown in Figure 6(j) is the result of wave forms 27 and 60. Thus there is presented a movable range spot 40, shown in Figure 6(l), on the indicator screen which is generated at a known interval with respect to the time of initiating the range sweep 39, shown in Figure 6(k). A portion of the output of the range sweep circuit 62 is applied to the stop sweep circuit 56, which returns the multivibrator 17 to its original mode in the manner heretofore described. If desired, a sweep current control similar to the control 53 described and illustrated with reference to Figures 1 and 3 may be incorporated into the respective sweep generator circuits of the system illustrated in Figure 5 to alter the scale of presentation on the indicator screen. Suitable video blanking circuits, which prevent the output of the receiver from intensity modulating the tube 11 during a range sweep, may be arranged between the multivibrator 59 and the receiver 24.

In this specification several devices have been grouped together and are defined as circuits, such as the stop sweep circuit which consists of the initiator (pick-off triode) and amplifier and shaper. Likewise, the two half-multivibrators with a cathode follower therebetween (Figures 1, 2 and 3) is defined as an electronic switch with one condition of equilibrium. Also, a generator, such as the range sweep generator or the range spot generator, for examples, includes their associated amplifiers.

There is thus disclosed a novel and unique radar system in which a single cathode-ray tube is used to supply two separate indications: (1) the conventional P. P. I. representations that originate in a rotating antenna and are applied to the tube in conjunction with the energy in the main sweep circuit including a deflection coil and (2) representations gathered by the antenna from selected individual reflecting objects and applied to the tube in conjunction with the energy in the range sweep circuit that includes a second deflection coil. This is accomplished by supplying two respective sweep currents to the coils, originating in either, a single generator source circuit or in two separate source circuits and alternating the deflecting energy applied to the beam of the tube between that from the main sweep circuit and that from the range sweep circuit.

We claim as our invention:

1. In a radar system the combination of: a cathode-ray tube, a rotating receiving antenna, a first means for intermittently deflecting radially the beam of said tube to produce a main sweep of said beam, means for correlating the direction of said sweep with the azimuth positions of said antenna, a second means for deflecting radially the said beam, means cooperating with said second deflecting means to deflect said beam radially only between the time intervals of said first-mentioned radial deflections, and means for adjusting at will by said second deflecting means, and independently of said antenna rotation, the radial direction of the deflection of said beam.

2. In a radar system the combination of: a cathode-ray tube, a rotating receiving antenna, a first deflecting coil rotatably mounted on said tube, means for intermittently energizing said coil to deflect radially the beam of said tube to produce a main sweep of said beam, means for correlating the direction of said sweep with the azimuth positions of said antenna, a second deflecting coil rotatably mounted on said tube, means cooperating with said second deflecting coil to deflect said beam radially only between the time intervals of said first-mentioned radial deflections, and means for adjusting at will by said second deflecting coil, and independently of said antenna rotation, the radial direction of the deflection of said beam.

3. In a radar system the combination of: a cathode-ray tube, a rotating receiving antenna, a range pulse transmitter, a first deflecting coil rotatably mounted on said tube, means for intermittently energizing said coil simultaneously with the successive ranging pulses of said transmitter whereby a main radial deflection sweep of the beam of said tube is produced, means for correlating the direction of said main sweep with the azimuth positions of said antenna, a second deflecting coil rotatably mounted on said tube, means cooperating with said deflecting coil to deflect said beam radially only between the time intervals of said first-mentioned radial deflections, and means for adjusting at will by said second deflecting coil, and independently of said antenna rotation, the radial direction of the deflection of said beam.

4. In a radar system the combination of: a cathode-ray tube, a rotating receiving antenna, a range pulse transmitter, a first deflecting coil rotatably mounted on said tube, means for intermittently energizing said coil simultaneously with the successive ranging pulses of said transmitter whereby a main radial deflection sweep of the beam of said tube is produced, means for correlating the direction of said main sweep with the azimuth positions of said antenna, a second deflecting coil rotatably mounted on said tube, means for energizing said second deflecting coil and for deflecting said beam radially only between the time intervals of said first-mentioned radial deflections, and means for adjusting at will by said second deflecting coil, and independently of said antenna rotation, the radial direction of the deflection of said beam, means for generating range spot pulses at predetermined instants with respect to the instants of the energizing of said second coil, and means for applying said pulses to said tube whereby the said beam is intensity modulated.

5. In a radar system the combination of: a cathode-ray tube, including means for producing an electron beam, a rotating receiving antenna, a range pulse transmitter, a first deflecting coil rotatably mounted on said tube for producing a main sweep of said beam, means for correlating the direction of said main sweep with the azimuth positions of said antenna, a second deflecting coil rotatably mounted on said tube, a single energizing means for successively energizing said first coil coincidentally with the successive ranging pulses of said transmitter to produce a main radial deflection sweep, means cooperating with said second deflecting coil to deflect said beam radially only between the time intervals of said first-mentioned radial deflections, said last means including means for periodically disconnecting said energizing means from said first coil and connecting said energizing means to said second coil, and means for adjusting at will by said second deflecting coil, and independently of said antenna rotation, the radial direction of the deflection of said beam.

6. In a radar system the combination of: a cathode-ray tube, including means for producing an electron beam, a rotating receiving antenna, a range pulse transmitter, a first deflecting coil rotatably mounted on said tube for producing a main sweep of said beam, means for correlating the direction of said main sweep with the azimuth positions of said antenna, a second deflecting coil rotatably mounted on said tube, a single energizing means for successively energizing said first coil coincidentally with the successive ranging pulses of said transmitter to produce a main radial deflection sweep, means cooperating with said second deflecting coil to deflect said beam radially only between the time intervals of said first-mentioned radial deflections, said last means including means for periodically disconnecting said energizing means from said first coil and connecting said energizing means to said second coil, and means for adjusting at will by said second deflecting coil, and independently of said antenna rotation, the radial direction of the deflection of said beam, means for generating range spot pulses at predetermined instants with respect to the instants of the energizing of said second coil, and means for applying said pulses to said tube whereby the said beam is intensity modulated.

7. A radar system comprising: a transmitter radiating successive range pulses, a rotating antenna, a receiver, a cathode-ray tube connected to said receiver whereby the beam of said tube is intensity modulated by pulses received by said antenna and receiver, a first beam deflection coil rotatably mounted on said tube, means for correlating the positions of said first coil on said tube with the azimuth positions of said antenna, a second beam deflecting coil rotatably mounted on said tube, means for rotating said second coil with relation to said tube, a main sweep circuit connected to said first coil to produce a flow of sawtooth current therethrough, a stop sweep circuit means connected to the output of said main sweep circuit to initiate the return period of each sawtooth wave of said sawtooth current in response to said current reaching a predetermined amplitude, a delay circuit connected to the output of said stop sweep circuit means, a wave generator connected to the output of said delay circuit, a range sweep circuit connected to the output of said generator, the output of which range sweep circuit is connected to said second coil, a range spot pulse generator connected to the output of said generator the output of which range spot generator is connected to said tube whereby the beam of said tube is intensity modulated, and switching means connected to said main sweep circuit and responsive to said transmitter and to the output of said stop sweep circuit means, whereby said main sweep circuit is initiated simultaneously with the initiation of said transmitter pulses and terminated by the output of said stop sweep circuit means.

8. A radar system defined in claim 7 characterized by the said main sweep circuit and the said range sweep circuit including means for controlling the rise time in said circuits.

9. A radar system defined in claim 7 characterized by the output of said wave generator being connected to said receiver whereby the said receiver is blanked off during the interval of the said range sweep.

10. A radar system defined in claim 7 characterized by the said range spot pulse generator including calibrated means for initiating the generation of the range spot pulse a determined interval of time after the receipt of the output from said delay circuit, whereby the range spot appearing on the said tube may be moved along the said range sweep and the corresponding range of a spot on said range sweep may be determined.

11. A radar system defined in claim 7 characterized by the generator in said main sweep circuit and the generator in said range sweep circuit being a single unit the output of which unit is applied to either the said first coil or said second coil through a second switching means triggered by the output of said stop sweep circuit means applied through a divider.

12. A radar system defined in claim 7 characterized by the said main sweep circuit includes a mixing circuit.

13. A radar system defined in claim 7 characterized by the said range sweep circuit includes a mixing circuit.

14. A radar system defined in claim 7 characterized by the said switching means includes a two stage multivibrator and a cathode follower therebetween, the input to the first stage being the output of the transmitter trigger circuit, the input to said cathode follower being the output of said first stage, the outputs of said cathode follower being supplied to said main sweep generator and to the input of said second stage, the inputs of said second stage being the output of said cathode follower and the output of said stop sweep circuit means and the output of said second stage being an input of said first stage and the blanking input to said main sweep circuit.

15. In a pulse-echo radar system, means for transmitting periodic radio pulses and for receiving said pulses after reflection, said means including a directive antenna and means for rotating said antenna, a cathode ray indicator tube having a screen, deflecting means associated with said cathode ray tube for providing a deflecting field for deflecting the cathode ray of said tube radially along said screen, means for rotating said deflecting field in synchronism with said antenna rotation, means for producing said radial deflection in synchronism with said pulse transmission, a second deflecting means associated with said cathode ray tube for providing a deflecting field for deflecting said cathode ray radially along said screen, means for rotating said last deflecting field independently of the first deflecting field, means for producing said last-mentioned radial deflection in synchronism with said pulse transmission, and means for causing said first-mentioned and said last-mentioned radial deflections to occur in time staggered relation so that they never occur during the same time interval.

16. Radar receiving apparatus for use in a pulse-echo radar system having means for transmitting periodic radio pulses and having a directive antenna and means for rotating said antenna, said receiving apparatus comprising a cathode ray indicator tube having a screen, deflecting means associated with said cathode ray tube for providing a deflecting field for deflecting the cathode ray radially along said screen, means for rotating said deflecting field in synchronism with said antenna rotation, means for producing said radial deflection in synchronism with said pulse transmission, a second deflecting means associated with said cathode ray tube for providing a deflecting field for deflecting the cathode ray radially along said screen, means for rotating said last deflecting field independently of the first deflecting field, means for producing said last-mentioned radial deflection in synchronism with said pulse transmission, means for causing said first-mentioned and said last-mentioned radial deflections to occur in time staggered relation so that they never occur during the same time interval, means for generating range spot pulses in definite timed relation to said last-mentioned radial deflections, means for applying said range spot pulses to said cathode ray tube to intensity modulate the cathode ray, and means calibrated in distance for adjusting the timing of said range spot pulses with respect to the instants said last-mentioned radial deflections start.

17. A pulse-echo radar indicating system comprising a cathode ray tube in which a cathode ray is produced, means for deflecting said cathode ray radially at a comparatively high periodic rate, means for rotating said cathode ray at a comparatively slow rate during said radial deflection, separate means for deflecting said cathode ray radially at a certain periodic rate and only between the periods of said first-mentioned radial deflections, and means for adjusting at will, and independently of said rotation, the angular position of said last-mentioned radial deflections.

18. The invention according to claim 17 wherein there is provided means for generating range spot pulses in definite timed relation to said last-mentioned radial deflections, means for applying said range spot pulses to said cathode ray tube to intensity modulate the cathode ray, and means calibrated in distance for adjusting the timing of said range spot pulses with respect to the instants said last-mentioned radial deflections start.

References Cited in the file of this patent

UNITED STATES PATENTS

| | | |
|---|---|---|
| 2,272,607 | Higonnet | Feb. 10, 1942 |
| 2,405,231 | Newhouse | Aug. 6, 1946 |
| 2,409,462 | Zworykin | Oct. 15, 1946 |
| 2,412,670 | Epstein | Dec. 17, 1946 |
| 2,422,697 | Meacham | June 24, 1947 |
| 2,448,016 | Busignies | Aug. 31, 1948 |
| 2,463,529 | Ferrill | Mar. 8, 1949 |
| 2,465,411 | Williams | Mar. 29, 1949 |
| 2,489,251 | Anast | Nov. 29, 1949 |
| 2,522,957 | Miller | Sept. 19, 1950 |
| 2,567,939 | Hugon | Sept. 18, 1951 |
| 2,572,975 | Berger et al. | Oct. 30, 1951 |
| 2,584,034 | Lee | Jan. 29, 1952 |
| 2,588,114 | Haworth | Mar. 4, 1952 |
| 2,603,775 | Chipp | July 15, 1952 |